United States Patent [19]

Sanders et al.

[11] Patent Number: 4,475,199

[45] Date of Patent: Oct. 2, 1984

[54] ZEEMAN MULTIOSCILLATOR RING LASER GYRO INSENSITIVE TO MAGNETIC FIELDS AND DETUNING FREQUENCIES

[75] Inventors: Virgil E. Sanders, Newbury Park; Thomas J. Hutchings, Thousand Oaks, both of Calif.

[73] Assignee: Litton Systems, Inc., Beverly Hills, Calif.

[21] Appl. No.: 443,057

[22] Filed: Nov. 19, 1982

Related U.S. Application Data

[63] Continuation of Ser. No. 155,724, Jun. 2, 1980.

[51] Int. Cl.$^3$ ............................................... H01S 3/00
[52] U.S. Cl. ......................................... 372/37; 372/29; 356/350
[58] Field of Search ........................... 372/84, 37, 29; 356/350

[56] References Cited

U.S. PATENT DOCUMENTS 4,213,705  7/1980  Sanders .............................. 356/350

Primary Examiner—William L. Sikes
Assistant Examiner—Léon Scott, Jr.
Attorney, Agent, or Firm—Poms, Smith, Lande & Rose

[57] ABSTRACT

A Zeeman ring laser gyro is described which includes a laser medium of helium-neon consisting of dual isotopes of $Ne^{20}$ and $Ne^{22}$ in which 53.5% is $Ne^{20}$ and 46.5% is $Ne^{22}$ by volume. The laser also includes a reciprocal anisotropic dispersion element of quartz which optically splits right and left circularly polarized laser waves by 250 MHz. The portion of the laser cavity in which laser emission is stimulated is exposed to a colinear magnetic field of $30_{-20}{}^{+10}$ gauss. The combined optimum parameters produce a laser gyro insensitive to changes in detuning frequencies and magnetic fields.

8 Claims, 13 Drawing Figures

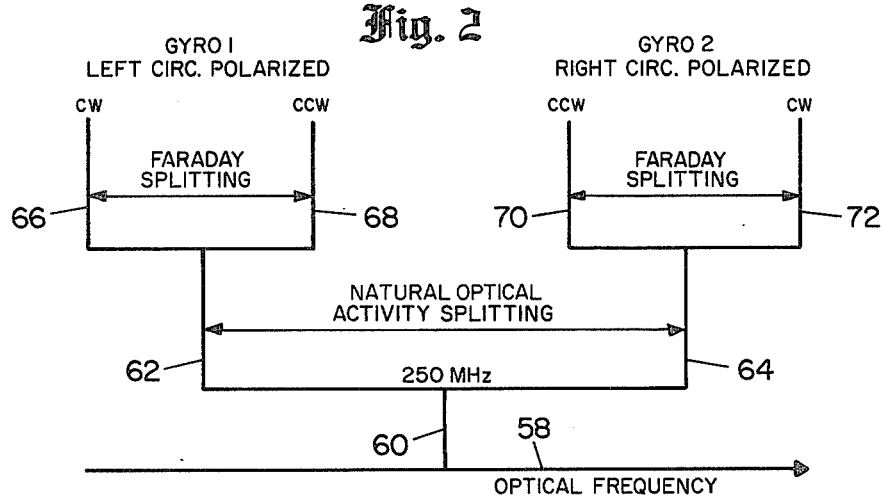
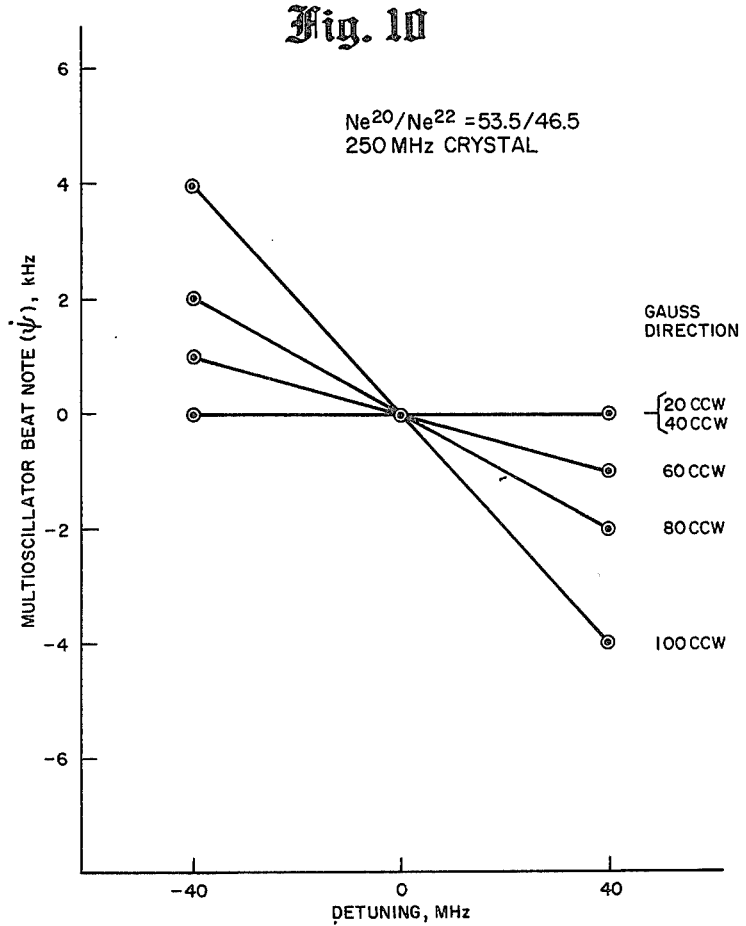

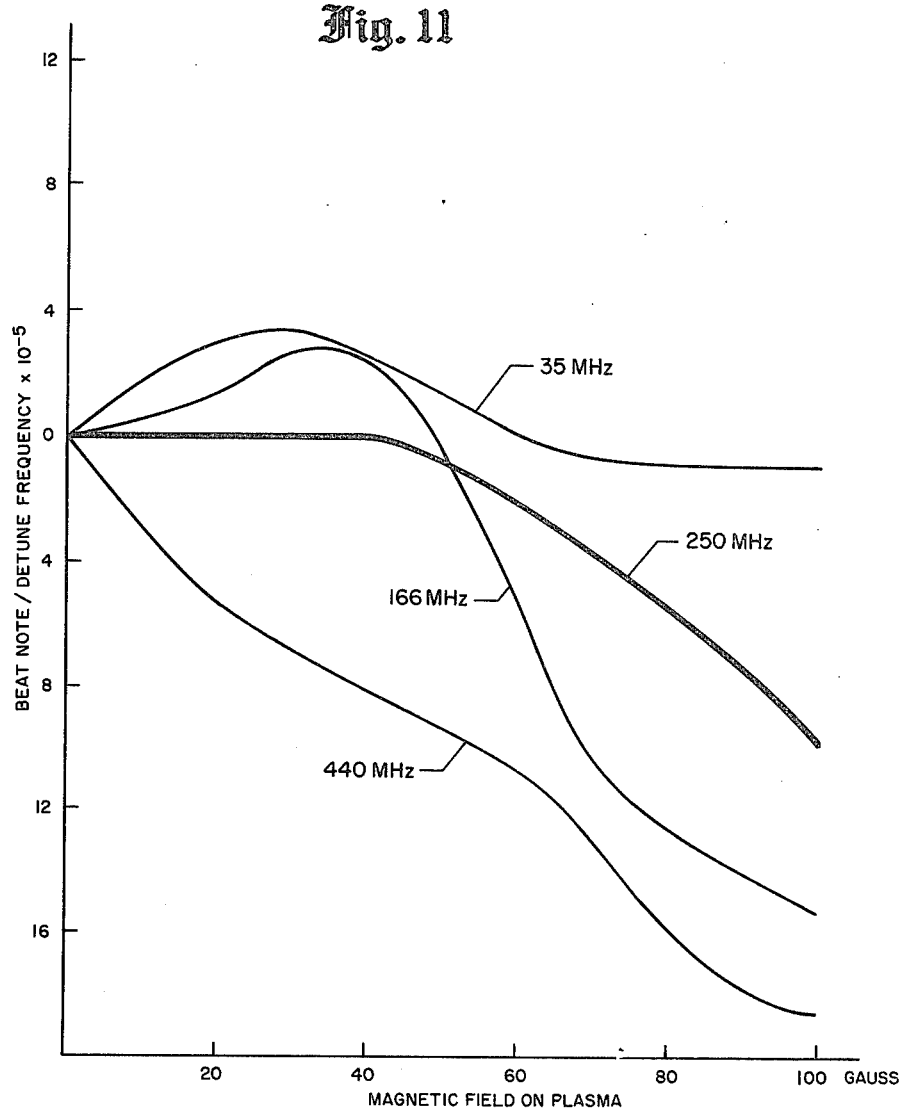

ZEEMAN MULTIOSCILLATOR RING LASER GYRO INSENSITIVE TO MAGNETIC FIELDS AND DETUNING FREQUENCIES

This application is a continuation of application Ser. No. 155,724, filed June 2, 1980.

FIELD OF THE INVENTION

The present invention relates to ring laser gyros and, more particularly, to an improved Zeeman ring laser gyro which is insensitive to changes in detune frequencies and magnetic fields.

BACKGROUND OF THE INVENTION

Ring laser gyroscopes utilizing counterrotating (i.e. counterpropagating) light beams are well-known. An example is shown in U.S. Pat. No. 4,006,989 which issued Feb. 8, 1977 to Keimpe Andringa for a "Laser Gyroscope". These devices are used for measuring rotation rates about an axis perpendicular to the plane of the ring laser resonant cavity by detecting the beat frequency which occurs due to a frequency difference between the counterrotating beams resulting from the rotation. However, for the ring laser gyroscopes to function at low rates of rotation, frequency locking or lock-in must be overcome. This phenomenon occurs when two traveling waves propagating in opposite directions in a resonant cavity at slightly different frequencies are pulled toward each other to combine in a single frequency standing wave. To avoid lock-in, the frequencies of the counterrotating waves must be sufficiently separated such that pulling together does not occur. The effects of lock-in are described in detail in *Laser Applications*, edited by Monte Ross, Academic Press, Inc., New York, N.Y. 1971, pp. 141 to 143.

The terms "light waves" or "light beams", as used herein, are not limited to only radiant energy waves with wavelengths in the visible range.

One proposal for eliminating lock-in in the ring laser resonant cavity is to use two pairs of counterrotating (counterpropagating) oppositely circularly polarized beams propagating in the cavity simultaneously. One pair consists of right circularly polarized light waves propagating in the clockwise and counterclockwise directions. The other pair consists of left circularly polarized waves which are also propagating in the clockwise and counterclockwise directions within the same resonant cavity. Such a four mode ring laser gyroscope configuration is described in detail in U.S. patent application, Ser. No. 959,237, filed Nov. 9, 1978 entitled "Four Mode Ring Laser Gyroscope With Minimum Hole Burning Competition" by Virgil E. Sanders which is assigned to the assignee of the present invention, now U.S. Pat. No. 4,213,705, issued July 22, 1980.

Disposed in the laser path of the propagating waves within the cavity are reciprocal anisotropic and nonreciprocal anisotropic dispersion elements. A reciprocal anisotropic dispersion element, such as an optical rotator made of crystal quartz, provides different delays or different optical indices to right and left circularly polarized waves. This difference in optical index due to sense of polarization is known as natural optical activity and results in an optical path length difference between oppositely polarized waves resonating within the same cavity. A nonreciprocal anisotropic dispersion element, such as a Faraday cell, presents different optical indices for light waves traveling in opposite directions such that waves traveling in the counterclockwise and clockwise directions have different delays. This delay difference produces different path lengths for light waves traveling in opposite directions. Therefore, the combination of the two types of anisotropy can be adjusted in frequency separation between resonant modes, such that all four modes resonate at different frequencies.

Separation between the resonant mode frequencies is accomplished so that the resonant frequencies of the two waves traveling in one direction are spaced between the resonant frequencies of the two waves traveling in the opposite direction. The two highest frequency modes have the same sense of polarization but opposite directions of propagation. Likewise, the two lowest frequency modes have the same sense of polarization, opposite from the sense of polarization of the other pair, and they are also counterrotating. Each pair of like-polarized modes operates as a separate two mode laser gyro. As the ring laser system is rotated about an axis perpendicular to the plane of the propagating waves, the frequency separation between the two higher frequency modes will either decrease or increase while the frequency separation between the two lower frequency modes will be oppositely affected; that is, either increase or decrease. The output beat signal resulting from combining the two lower frequency modes is subtracted from the output beat signal resulting from combining the two higher frequency modes. This produces a substantially linear representation or measure of the rotation and rotation rate of the laser system. Further, the direction of rotation is determined by monitoring one of the pairs of modes.

Because of the phenomenon known as "hole burning" the four frequencies of the four resonating modes in the cavity, in the prior art, must be substantially separated. The concept of hole burning involves the population depletion of available light emitting atoms in the gas laser medium which can emit radiant light waves at a given frequency. A laser beam sustained in a laser cavity through stimulated emission depletes the population of available light emitting atoms about that frequency and thereby results in a dip or "hole" in the laser gain vs. atom velocity curve. This hole has a certain width such that if two separate beams are operating on atom velocities very close to each other the holes overlap. As a result one of the resonant modes depletes the available atoms and will dominate the intensity of the mode operating at the adjacent frequency which will be substantially reduced or eliminated. The problems caused by hole burning were recognized by Frederick Aronowitz in his U.S. Pat. No. 3,411,849 which issued Nov. 19, 1968 entitled "Frequency Stabilized Laser". In FIG. 4 there is shown the dip or hole caused by the population depletion of the available light-emitting atoms. Hole burning is explained in detail in the text *Gas Laser Technology* by Douglas C. Sinclair and W. Earle Bell, Holt Reinhart and Winston, Inc. New York, N.Y. 1969, pp. 33-35.

In order to sustain all four resonating modes in the laser cavity, the frequencies of the four modes must be sufficiently separated to prevent the effects of hole burning competition. The frequency spacing must be such that there is no significant overlap between the hole burned or depleted by each resonating mode in the gain curves.

Reciprocal anisotropy is usually accomplished with a quartz crystal disposed in the laser beam path. To provide sufficient dispersion to avoid hole burning effects between the different propagating waves, in the prior art the crystal must be undesirably large. Its size contributes to thermal stresses which occur due to thermal gradients and temperature changes in the laser system and differences between coefficients of expansion of the crystal and the laser body. These stresses increase linear birefringence in the crystal, which increases coupling between different modes. Coupling here is an interaction between different waves traveling in the same direction which produces an error in the output of the laser gyro.

Typically, reciprocal and nonreciprocal anisotropy are achieved in the same element. A Faraday cell can be created by winding an electrical coil around the crystal and passing a DC current through the coil. The amount of nonreciprocal anisotropy occurring in the cell is determined by the length of the cell, the magnitude of the magnetic field, and the Verdet constant of the crystal material. A Verdet constant is defined as rotation per unit length per unit magnetic field strength. It is a material property such that different materials will have different Verdet constants associated with them.

For purposes of thermal stresses, the crystal is undesirably large. Its length, however, is very small for purposes of a Faraday cell. To achieve the required nonreciprocal anisotropy, the prior art magnetic field over the short length of the crystal must be relatively large, typically over 1000 gauss. Such high field intensity is difficult to control over the short length of the crystal element.

The above-mentioned copending patent application by V. E. Sanders teaches an approach in which the length of the reciprocal anisotropic dispersion element or quartz crystal may be reduced and the gain plasma sections may be used as a nonreciprocal anisotropic dispersion element or Faraday rotator with a greatly reduced field intensity. This concept was also discussed in a paper by V. Sanders and S. Madan and W. Chow and M. Scully, entitled "Properties of Zeeman Multi-Ocillator Ring Laser Gyro", published in the Proceedings of the IEEE 1979, National Aerospace and Electronics Conference, NAECON'79, published May, 1979. In both the patent application and the paper, a reciprocal anisotropic dispersion of as small as 10 MHz and nonreciprocal anistropic dispersion of 1 MHz are discussed.

The above-mentioned copending patent application by V. E. Sanders and the article by V. Sanders et al also describe the utilization of a laser medium, helium-neon, which includes the dual neon isotopes $Ne^{20}$ and $Ne^{22}$. The patent applications and paper describe how a Zeeman ring laser exhibits a large bias at zero detuning and an extreme sensitivity to cavity length tuning. The paper goes on to state that this bias may be reduced to zero by adjusting the $Ne^{20}$ to $Ne^{22}$ isotope ratio. In U.S. Pat. No. 4,110,045 which issued Aug. 29, 1978 entitled "Electromagnetic Wave Ring Resonator" by Irl W. Smith and Terry A. Dorschner, there is disclosed an ideal ratio of 52% $Ne^{20}$ to 48% $Ne^{22}$. One feature of the present invention springs from a review of the dual isotope ratios and an unexpected discovery that one ratio creats an improved Zeeman ring laser gyro.

Other parameters have also been reviewed with a goal of creating an improved ring laser gyro. The result of some of this effort has been recently reported in a paper by V. E. Sanders, S. Madan, W. Chow and M. O. Scully entitled "Beat-note Sensitivity In A Zeeman Laser Gyro: Theory And Experiment" which was published in Optics Letters, March 1980, Vol. 5, No. 3.

SUMMARY OF THE INVENTION

The Zeeman laser gyro described in the following specification is generally known and discussed above. What has been determined by the present invention is that a set or family of optimum parameters exist from which one may select values that create an improved Zeeman laser gyro that is insensitive to magnetic fields and detuning frequency. The result of one particular parameter, the optical activity splitting frequency of the reciprocal anistropic dispersion element, was unexpected. When the optical activity splitting is combined with properly selected Faraday splitting from the nonreciprocal anisotropic dispersion means, a laser gyro which is insensitive to variations in the detuning frequency was unexpectedly developed.

It has been further discovered through experimentation that there exists other parameters in the set of optimum parameters which permit a Zeeman ring laser to function in a configuration that is insensitive to fluctuating in the magnetic fields to which it is exposed in addition to the previously mentioned insensitivity to detuning frequency. Be remined that variations of detuning frequency are generated by the changing length of the ring laser cavity.

Through this experimentation it has been determined that the reciprocal anisotropic dispersion element utilized within a Zeeman ring laser should be established at a length which generates a natural optical activity splitting between the right circularly polarized light and the left circularly polarized light equal to 250 MHz, 166 MHz, 35 MHz and perhaps others. For most values below 250 MHz an optimum parameter may be found which creates a ring laser that is insensitive to detuning frequencies but remains sensitive to variations in the magnetic field. However, optimum parameters have been found below 250 MHz which can produce an unexpectedly improved gyro especially if the gyro is subjected to an offset of its detuning frequency. For values above 250 MHz it has been found that there are no conditions under which the ring laser gyro is insensitive to either magnetic field fluctuations or detuning frequencies. The ideal natural optical activity splitting occurs when the Zeeman ring laser is insensitive to the detuning frequency and insensitive to the magnetic field. This has been found to occur at the 250 MHz separation with a variation of ±10 MHz although other frequencies are also beneficial.

In evaluating the optimum parameters, established by experiment, it has been found that the magnetic field may vary substantially from zero to 50 gauss and in some cases to 100 gauss, a relatively low value for magnetic fields in most prior art ring lasers as described above. One of the ideal parameters for the optimum magnetic field may vary between 10 to 40 gauss or 30±20 gauss. Further, one of the optimum isotope ratios of $Ne^{20}$ to $Ne^{22}$ has been found to be 53.5±1% by volume $Ne^{20}$ to 46.5±1% by volume $Ne^{22}$.

DESCRIPTION OF THE DRAWINGS

FIG. 2 illustrates the natural optical activity splitting and Faraday splitting of the laser frequency into four modes;

FIG. 10 shows a curve of multioscillator beat note frequency vs. detuning frequencies for different magnetic fields (ccw only) with optical activity splitting equal to 250 MHz and dual isotopes of $Ne^{20}$ and $Ne^{22}$ equal to 53.5% to 46.5% by volume; and FIG. 11 shows a curve of the derivative of beat note frequency over the detuning frequency vs. the value of the magnetic fields for the various optical activity splitting frequencies shown in FIGS. 4–10.

DETAILED DESCRIPTION OF THE INVENTION

Figure 1:
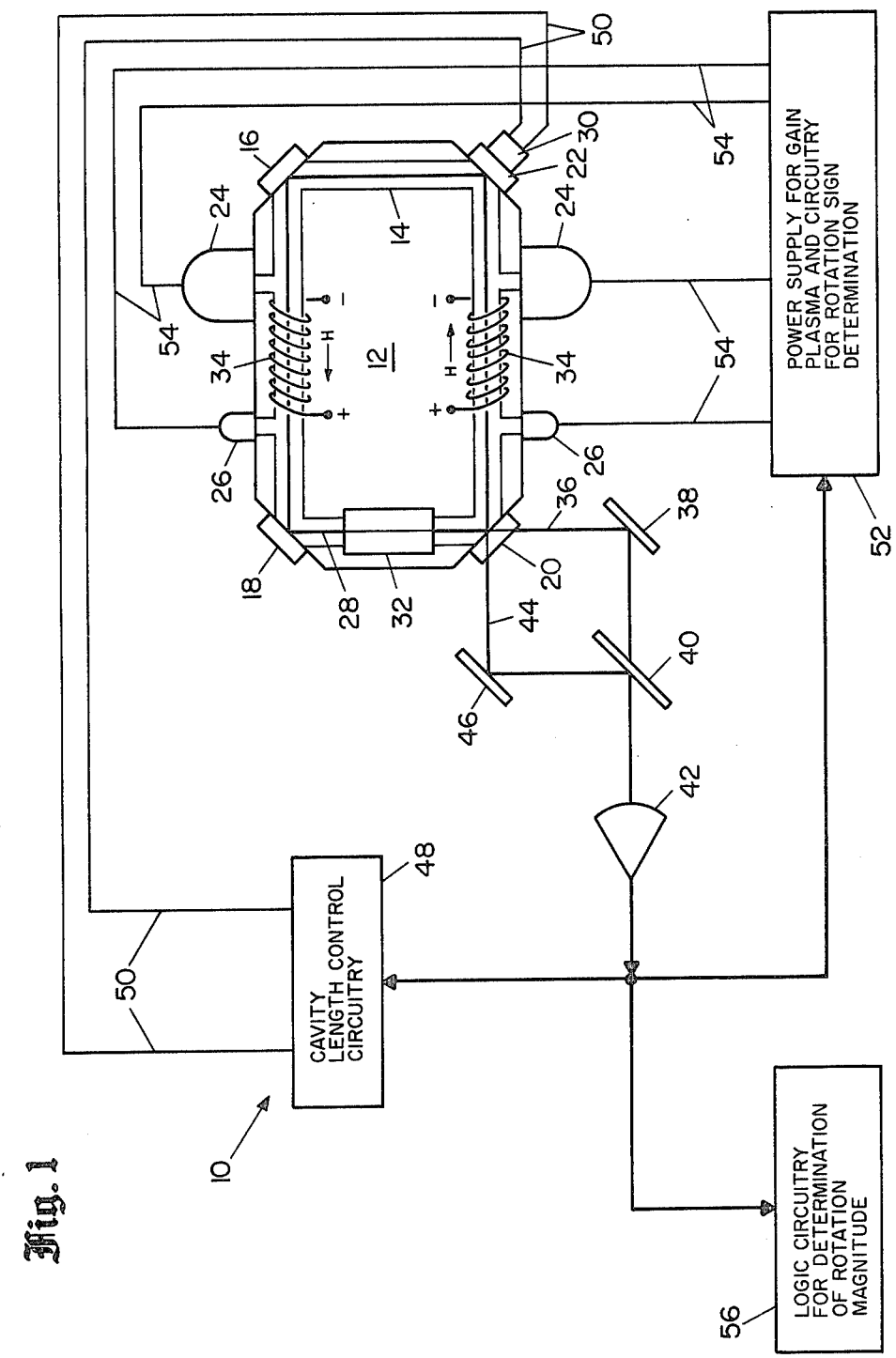
FIG. 1 is a schematic drawing showing a Zeeman multioscillator ring laser gyro and associated circuitry.

A Zeeman multioscillator ring laser gyro 10 is shown in FIG. 1 which includes a laser body 12 with a sealed resonant laser cavity 14. The cavity 14 provides a rectangular resonant path with mirrors 16, 18, 20 and 22 at its four corners. The sealed cavity 14 is filled with a dual isotope gain medium, such as a helium-neon gas mixture, wherein the isotopes of neon 20 ($Ne^{20}$) and neon 22 ($Ne^{22}$) are the two active isotopes. In two portions of the cavity 14 between cathodes 24 and anodes 26 the gas is electrically excited to become a light emitting laser gain medium or plasma to sustain resonant laser waves.

Mirrors 16 and 18 are used solely for reflecting the beams in a closed laser path 28 within the laser cavity 14. Mirror 22 is attached to a piezoelectric element 30 which moves the mirror in and out as part of the cavity length control system. Mirror 20 is partially reflective for allowing a small portion of the waves incident on its surface to pass through the mirror and be combined and processed to provide rotational information. Line 28 represents the ring laser path containing four modes of circularly polarized light.

The ring laser gyro 10 is equipped with a reciprocal anisotropic dispersion element 32. Natural optical activity splitting occurs within element 32 as the circularly polarized light within the laser path 28 passes therethrough as is well-known in the art. The splitting may be accomplished with a material such as quartz crystal oriented so that the light waves travel along its optic axis. Elements 34 are electric coils with a DC current applied which provide a magnetic field over the plasma gain sections between cathodes 24 and anodes 26. Coils 34 are wound around the entire sections between the cathodes 24 and anodes 26 to provide a magnetic field collinear to the laser path 28 and substantially over the entire gas plasma light source. The magnetic fields H of coils 34 may vary but, in the preferred embodiment, should be matched with the value of the natural optical activity splitting as will be described below.

Imposition of the magnetic field over the laser path will provide nonreciprocal anisotropic dispersion, or Faraday rotation, between the clockwise and counterclockwise rotating beams. Also the field superposed over the excited plasma provides Zeeman frequency splitting between the light emitting atoms in the plasma such that hole burning effects in the gain curves for right and left circularly polarized light will be substantially reduced when the lasing frequencies are close together. The Zeeman effect is explained in the above mentioned copending application by V. E. Sanders and the text *Fundamentals of Optics* by Francis A. Jenkins and Harvey E. White, McGraw-Hill, New York, N.Y. 1957, pages 588 through 595.

Line 36 represents that portion of the laser beams 28 rotating in a counterclockwise direction in the multioscillator system 10 which strike and pass through the partially reflective mirror 20. The beams 36 strike an external mirror 38 and are reflected through a beam splitter 40 onto a single photodiode 42. Line 44 represents that portion of the laser beams 28 rotating in a clockwise direction in the system 10 which pass through mirror 20 and strike a second external mirror 46 where they are deflected to beam splitter 40 and made approximately colinear with line 36. The four beams simultaneously striking photodiode 42 generate several beat frequencies due to the difference in frequency between all of the individual beams.

The beat frequencies between all of the four modes oscillating in the cavity are detected in the photodiode 42 as described in U.S. Pat. No. 4,123,162, which issued Oct. 31, 1978, entitled "Multioscillator Ring Laser Gyro Output Information Processing Method", by V. E. Sanders. The information generated from the beat frequencies between the four oscillating modes or multioscillator beat note frequency is used for determination of the magnitude of the rotation of the ring laser system as well as cavity length control and determination of the direction. A detailed description of how this information is used for the above purposes is provided in the referenced patent.

A cavity length control circuitry 48 provides an AC signal along leads 50 to the piezoelectric element 30. This AC signal moves mirror 22 in and out resulting in variation of the cavity length of the ring laser 10 thus generating the detuning frequency of the gyro. This varies the output of the ring laser in diode 42 at the same frequency as the AC component in leads 50 and thereby provides feedback to the cavity length control circuitry 48. This feedback is processed as described in the above-referenced patent to control the DC component along leads 50 to optimize the length of the ring laser cavity for maximum output.

Cathodes 24 and anodes 26 are attached to a power supply 52 along leads 54. The cathodes and anodes provide an electrical field over the gas laser medium sufficient to maintain stimulated light emission from the gas atoms to sustain the propagating laser waves. Voltage across cathodes 24 and anodes 26 is oscillated at a constant frequency in the power supply 52 to vary the output generated in photodiode 42. This output variation is processed in circuitry 52 for determination of the direction of rotation of the gyro system in accordance with the previously referenced patent. Output from photodiode 42 is also fed to logic circuitry 56 for determination of the magnitude of rotation of the ring laser 10.

FIG. 2 illustrates how reciprocal and nonreciprocal anisotropic elements produce frequency separation between the four resonating modes in the ring laser cavity 14. In frequency space where increasing optical frequency is represented by line 58, line 60 represents the resonant frequency of the ring laser cavity. The reciprocal anisotropic dispersion element 32 (natural optical activity splitting crystal) in the ring laser path 28 causes frequency splitting between left and right circularly polarized light as represented by lines 62 and 64, respectively. Further frequency splitting of the four resonating modes in the gyro cavity is accomplished by nonreciprocal anisotropic dispersion elements (Faraday splitting) in the plasma with the magnetic field of coils 34 which causes clockwise and counterclockwise polarized light waves to experience different optical indices. Lines 66 and 68 represent the results of Faraday splitting the left circularly polarized counterrotating waves represented by line 62. In the same manner lines 70 and 72 show the effects of Faraday splitting on right circularly polarized counterrotating light waves represented by line 64. It should be noted that lines 66 and 72 represent frequencies of clockwise rotating waves. The lower and upper limits of the frequency spectrum in a four mode gyro will travel in the same direction in the laser cavity. If the magnetic field polarity is reversed in coils 34, the direction of the frequency extremes will be reversed.

As the ring laser 10 is rotated about an axis perpendicular to the plane of the laser path 28 in the counterclockwise direction, frequencies 66 and 72 will increase while frequencies 68 and 70 will decrease. Because gyro output is a function of the separation between the frequencies of clockwise and counterclockwise rotating beams in the laser cavity, output from gyro 1 will decrease while the output from gyro 2 will increase. Conversely, if the laser system is rotated in a clockwise direction the outputs from gyros 1 and 2 will increase and decrease, respectively.

Figure 3:
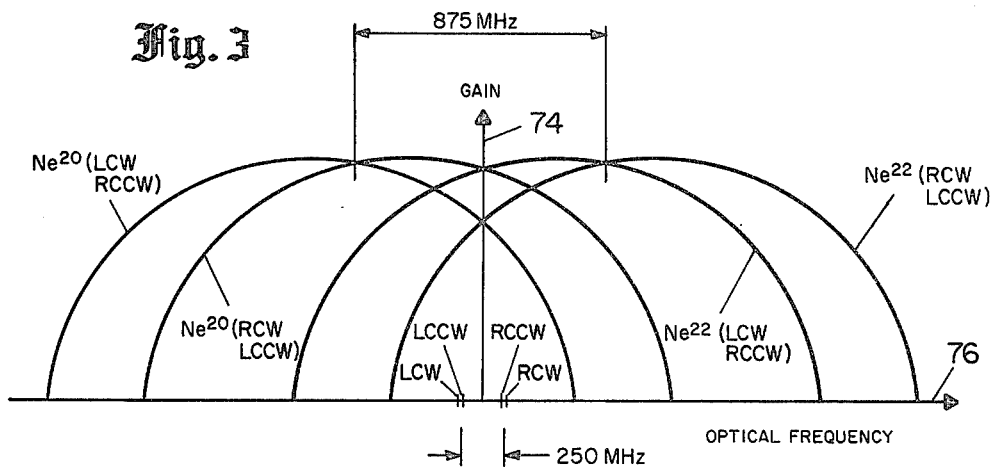
FIG. 3 shows a graph of gain vs. frequency for each isotope in the dual isotope laser medium.
Figure 3A:
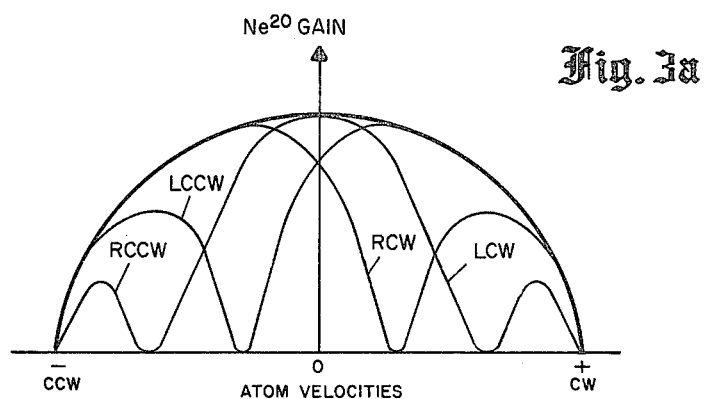
FIG. 3a shows a curve of gain vs. atom velocity of the $Ne^{20}$ isotope corresponding to the left-hand curve of FIG. 3.
Figure 3B:
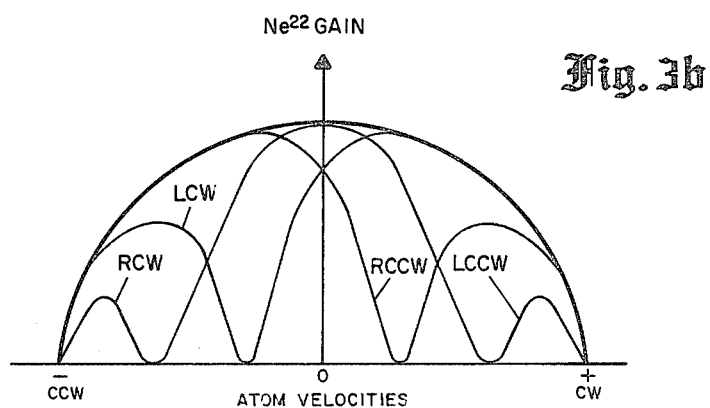
FIG. 3b shows a curve of gain vs. atomic velocity of the $Ne^{22}$ isotope corresponding to the right-hand curve of FIG. 3.

FIG. 3 is included herein to complete the explanation of the Zeeman multioscillator ring laser gyro. This figure shows increasing gain along line 74 vs. increasing optical frequencies along line 76. When the laser medium consists of dual isotopes of $Ne^{20}$ and $Ne^{22}$, the exposure of the gain medium to the magnetic field generated by coils 34 causes the mediums to shift their point of maximum gain with respect to the natural 6328-Å transition of the helium-neon gain medium. These transitions are approximately 875 MHz apart. The transition is caused by the Zeeman splitting effect. FIG. 3a shows the gain vs. atomic velocity curve for the $Ne^{20}$ isotope which corresponds to the left-hand curves of FIG. 3; while FIG. 3b shows the gain vs. atomic velocity curve of the $Ne^{22}$ isotope corresponding to the right-hand curve of FIG. 3. Through the utilization of Zeeman splitting, the effects of hole burning are avoided as described in the copending patent application by V. E. Sanders entitled "Four Mode Ring Laser Gryoscope With Minimum Hole Burning Competition".

An extreme amount of experimental effort has been invested over the last three years to determine the optimum parameters of a Zeeman multioscillator ring laser gyro described by this invention. As discussed in the Smith et al U.S. Pat. No. 4,110,045 it was believed that a ratio of $Ne^{20}$ to $Ne^{22}$ equal to of 52% to 48% by volume was the most desirable mixture of dual isotopes.

Figure 4:
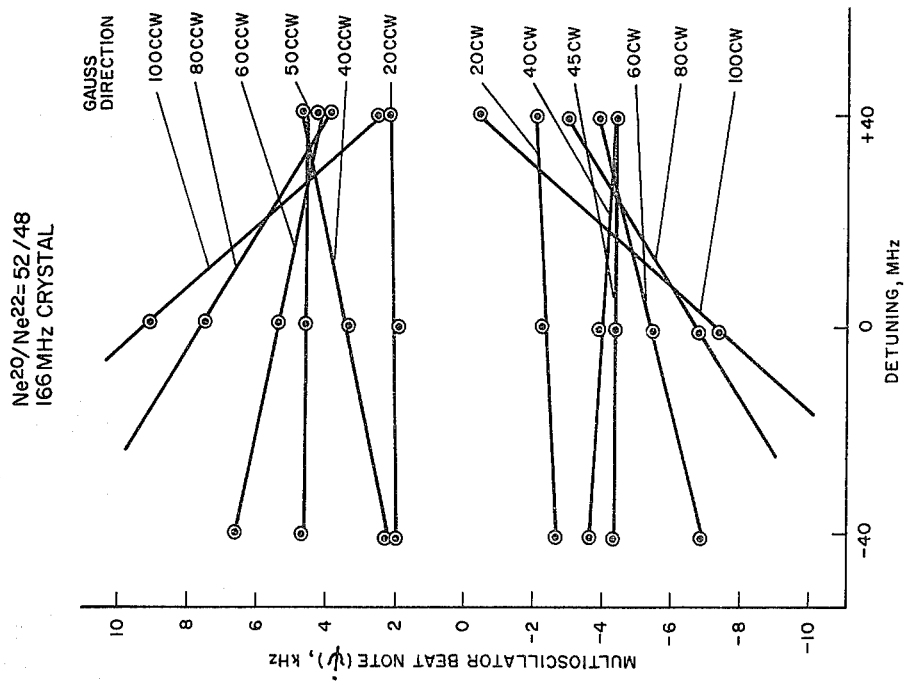
FIG. 4 shows a curve of multioscillator beat note frequency vs. detuning frequency for different values of magnetic fields with optical activity splitting equal to 166 MHz and dual isotopes of $Ne^{20}$ to $Ne^{22}$ equal to 52% to 48% by volume.

FIGS. 4, 5, 6, and 7 illustrate multioscillator beat note frequency vs. detuning frequency for different values of axial magnetic fields wherein a natural optical activity splitting of 166 MHz was accomplished by a quartz crystal having the required length for such splitting when compared with the length of the ring laser cavity path. It will be observed from FIG. 4 that a dual isotope mixture of 52% $Ne^{20}$ to 48% $Ne^{22}$ was tested in a Zeeman ring laser. While magnetic fields of 20 or 50 gauss present a generally flat line indicating that the beat note of the system is generally insensitive to changes in detune frequency in magnetic fields of this value, the spacing between the curves for the various field values indicates that the system of FIG. 4 is very sensitive to changes in magnitude of the magnetic field. It should be noted that the direction of the magnetic field indicated by clockwise (cw) or counterclockwise (ccw) on the right-hand side of FIGS. 4-7 does not effect the slopes of the multioscillator beat note vs. detuning curves other than to reverse the polarity, as would be expected. It should also be noted that a gyro operating with a national optical activity splitting of 166 MHz in a field of 50 gauss will be insensitive to variations in the detuning frequency. However, if the gyro is not adquately shielded, it will be sensitive to variations in the magnetic field as seen in FIG. 4.

Figure 5:
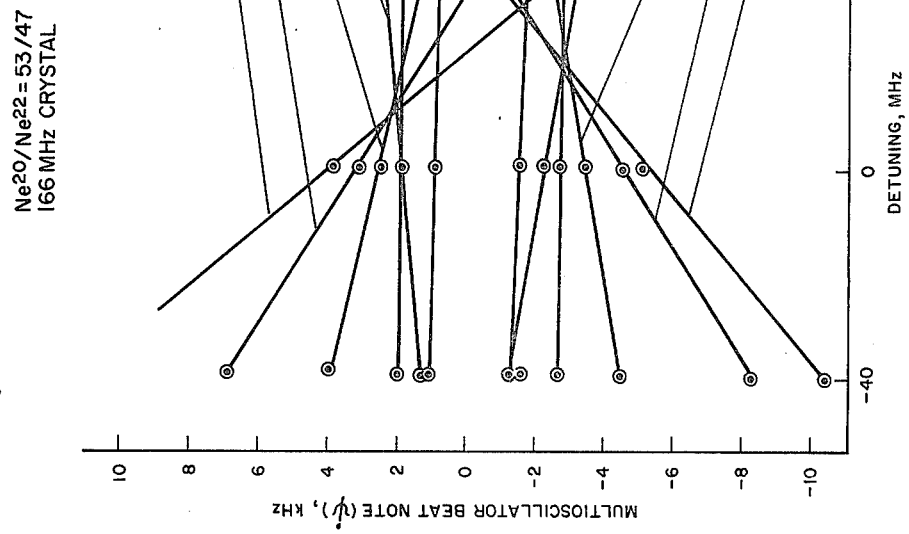
FIG. 5 shows a curve of multioscillator beat note frequency vs. detuning frequency for different values of magnetic fields with optical activity splitting equal to 166 MHz and dual isotopes of $Ne^{20}$ to $Ne^{22}$ equal to 53% to 47% by volume.

FIG. 5, like FIG. 4, shows the existance of flat curves for magnetic fields of 20 or 50 gauss indicating that the beat note frequency in these fields are generally insensitive to detuning frequency. However, again the spread between the various curves indicates that the system utilizing an isotope mixture of 53% $Ne^{20}$ to 47% $Ne^{22}$ by volume is not stable with respect to changes of value in the magnetic fields.

Figure 6:
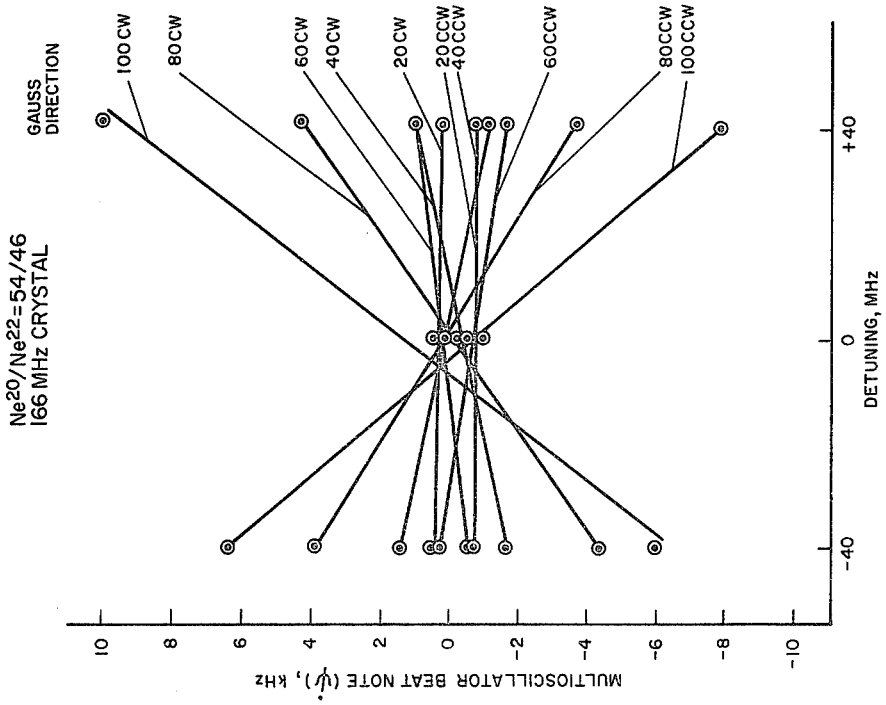
FIG. 6 shows a curve of multioscillator beat note frequency vs. detuning frequency for different values of magnetic fields with optical activity splitting equal to 166 MHz and dual isotopes present in 54% to 46% by volume

FIG. 6 shows flat curves for magnetic fields of 20 gauss and relative flat curves for fields of 40 gauss. In the curve of FIG. 6 it will be noted that a broader range of magnetic fields produce a system in which the variations of the detuning frequency do not effect the beat note frequency. Further all of the curves cross at zero detuning indicating that a dual isotope mixture of 54% $Ne^{20}$ to 46% $Ne^{22}$ is insensitive to changes in mangetic fields at least at a zero detune frequency. It has been found that the beat note frequency must be stable to within ±1 hertz whereas the detuning frequency may vary from ±10 MHz. Within these variations, a stable Zeeman laser gyro may be created which is insensitive to both detuning frequency changes and magnetic fields.

Figure 7:
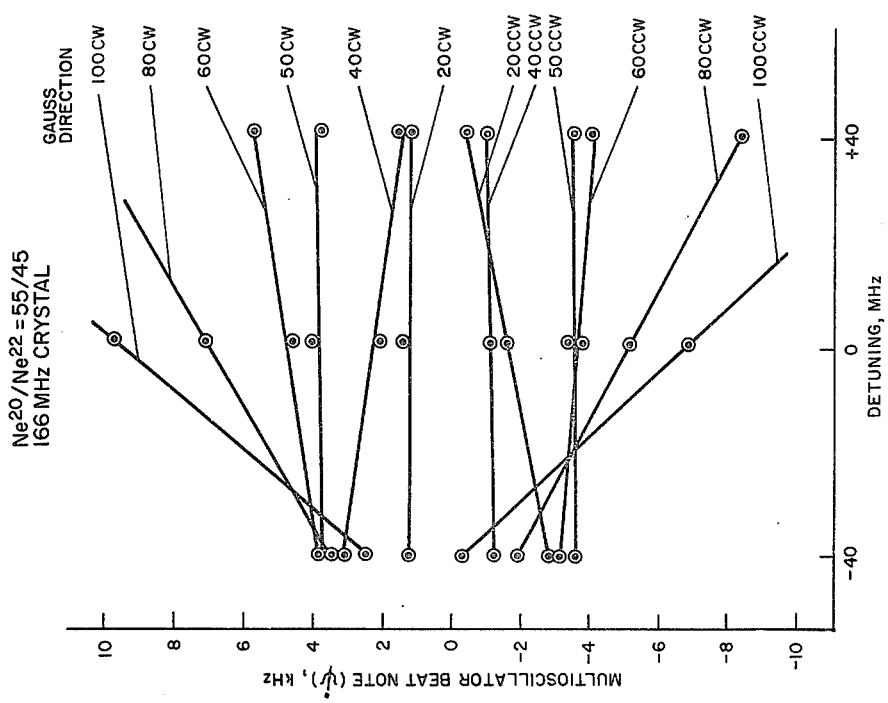
FIG. 7 shows a curve of multioscillator beat note frequency vs. detuning frequency for different values of magnetic fields with optical activity splitting equal to 166 MHz and dual isotopes of $Ne^{20}$ to $Ne^{22}$ equal to 55% to 45% by volume.

FIG. 7 illustrates that the curves for a 20 gauss magnetic field remain flat, while the curves for a 40 and 50 gauss field remain relatively flat, as in FIG. 6, when the dual isotopes include 55% Ne[20] to 45% Ne[22] by volume. However, the system depicted in FIG. 7 again illustrates sensitivity to charges in magnetic field. Note that the curves in FIG. 6 charged location with the curves in FIG. 5 in that the clockwise gauss curves are now in the upper portion of FIG. 6 while counterclockwise curves are in the lower portion. The information contained in FIGS. 4–7 illustrates that a Zeeman ring laser is most stable with regard to magnetic field fluctuations and charges in detuning frequency when the dual isotopes include a mixture of 53.5% Ne[20] to 46.5% Ne[22]. The maximum variation of this ratio has been found to be ±1% by volume.

Figure 8:
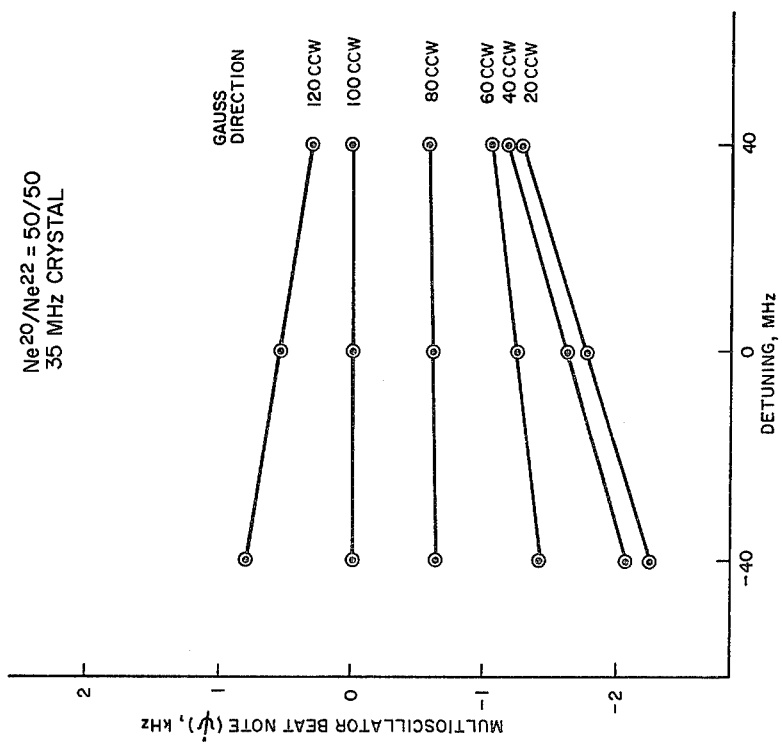
FIG. 8 shows a curve of multioscillator beat note frequency vs. detuning frequency for different values of magnetic fields (ccw only) with optical activity splitting equal to 35 MHz and dual isotopes present equal in quantities.

Referring now to FIG. 8 a curve representing the beat note frequency vs. detuning frequency for a crystal having a natural optical activity splitting of 35 MHz is shown. Here, it should be noted that the beat note frequency is stable during variations of the detuning frequency at 100 gauss. However, the system is not stable during variations of the magnetic field. Note that only counterclockwise fields have been shown in FIGS. 8–10.

Figure 9:
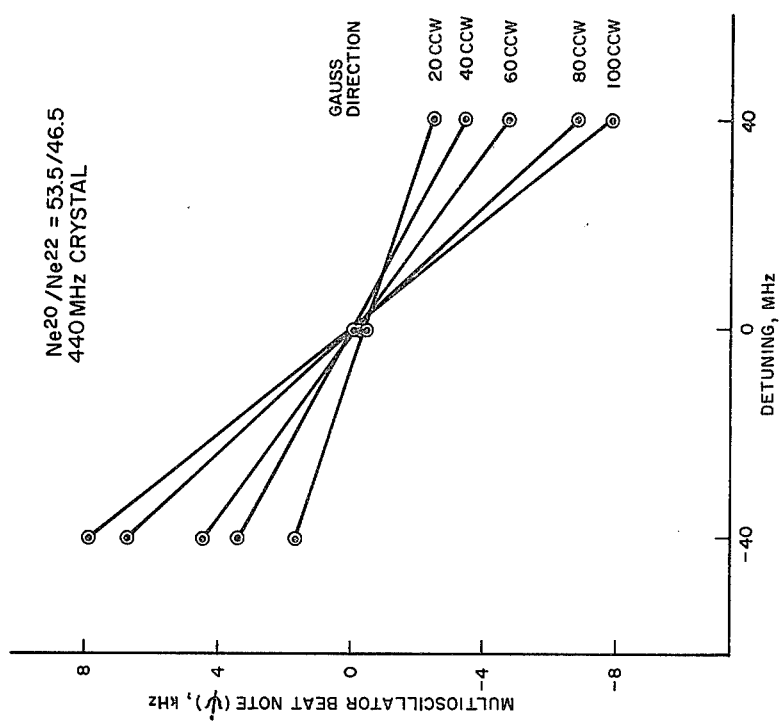
FIG. 9 shows a curve of multioscillator beat note frequency vs. detuning frequency for different values of magnetic fields (ccw only) with optical activity splitting equal to 440 MHz and dual isotopes of $Ne^{20}$ and $Ne^{22}$ equal to 53.5% to 46.5% by volume.

FIG. 9, illustrates a beat note frequency vs. detuning frequency for a crystal having a natural optical activity splitting of 440 MHz. While all of the curves converge at zero detuning, it will be noted that none of the curves are flat and thus the system does not produce a situation in which the beat note frequency is unaffected by detuning frequency changes. The parameters of this system clearly create an inoperative Zeeman laser gyro indicating that any gyro designed with a natural optical activity splitting of 440 MHz would be unstable due to magnetic field changes and changes in detuning frequency.

FIGS. 8 and 9 contrast the dual isotope ratios, however. In FIG. 8 the ratio of Ne[20] to Ne[22] is 50% to 50% by volume, showing a spread of curves. In FIG. 9 the isotope ratio plotted for Ne[20] to Ne[22] is 53.5% to 46.5% by volume. The converging curves illustrate insensitivity to charges in magnetic field at the 53.5/46.5 ratio even though the system is sensitive to charges in detuning frequency.

FIG. 10, like FIGS. 8 and 9, shows the plot of a beat note frequency vs. deturning frequency for a reciprocal anisotropic dispersion element whose natural optical activity splitting is 250 MHz. Here, it should be noted that the curve showing the relationship between the beat note frequency and detuning frequency is flat and located at the zero line value of the beat note. This clearly indicates that the system characterized by a 250 MHz optical splitting crystal is insensitive to detuning frequency changes. Further, the curves for 10, 20, 30 and 40 gauss are colinear indicating that the system is also insensitive to magnetic field fluctuation. Thus, it may be said that an optimum ring laser utilizing the Zeeman effect should incorporate a crystal that creates a natural optical activity splitting of 250 MHz. The flat curves for 0 to 40 gauss were not predicted by theoretical analyses and were unexpected.

This concept is further explained in FIG. 11 wherein the derivative of a beat note frequency with respect to the detuning frequency is plotted versus the magnetic field generated by a nonreciprocal anisotropic dispersion element. From FIG. 11 it becomes apparent that the 250 MHz optical splitting crystal is linear along the zero axis created by the plot of the derivatives of the beat note with respect to detuning frequency versus magnetic field. This curve starts to roll off around 40 to 45 gauss. Thus, it is apparent that the optimum parameter for a Zeeman ring laser includes a 250 MHz crystal in a field which may vary from 10 to 40 or 45 gauss. It will be understood that zero gauss is inappropriate since the Zeeman splitting would then disappear. However, there are some applications where a very low magnetic field is useful. Thus, an appropriate range for the magnetic field is 30±20 gauss whereas the range of the 250 MHz crystal is ±10 MHz.

From a further study of FIG. 11, it will be seen that the 440 MHz crystal starts at the point of zero detuning frequency and zero magnetic field and drops immediately never crossing the zero line established by the derivative of the beat note versus detuning frequencies. This lack of zero crossing confirms the statements made above with regard to FIG. 9 that the 440 MHz crystal is unsuitable for use within a Zeeman ring laser. However, the 35 MHz and 166 MWz crystals are suitable for use within a Zeeman ring laser provided the ring laser may function in a system where sensitivity to magnetic field variations is unimportant. Here, it will be seen that the 35 MHz crystal crosses the zero line at 100 gauss. In this configuration, a 35 MHz crystal in a 100 gauss field will be insensitive to detuning frequencies. However, the system would be sensitive to changes in magnetic field. Thus, a usable tolerance on the magnetic field is approximately ±1 hertz whereas a useful tolerance on the crystal is 35±2 MHz. Similarly, a review of the curve representing the 166 MHz crystal shows that it crosses the zero line at 50 gauss with a very steep slope. Thus, the tolerance for a usable system in which the 166 MHz crystal may be used is 50±0.1 gauss.

Clearly, the most desirable crystal is one that creates a curve whose derivative of beat note frequency to detuning frequency crosses the zero line at a flat slope. It has been found that the 250 MHz natural optical activity splitting is the ideal value. As stated above, any frequency above this value does not appear to work at all; while frequencies below this value will produce a system that is generally insensitive to detuning frequency but sensitive to changes of magnetic flux.

Accordingly, it will be understood from reviewing the foregoing that the optimum parameters of a Zeeman multioscillator ring laser gyro include a gyro utilizing a reciprocal anisotropic dispersion element whose natural optical activity splitting is 250±10 MHz in a magnetic field of 30±20 gauss. The Faraday splitting frequency is not a critical frequency. Its value, as illustrated by the spacing between lines 66 and 68, for example, may be adjusted by adjustment of the parameters that affect the coils 34 and the magnetic field they generate, provided the effects of such fields upon Zeeman splitting within the 30±20 gauss range by considered. Further, after review of FIGS. 4–7, it will be noted that the ideal dual isotope mixture of the helium-neon gas that forms the laser medium includes isotopes of Ne[20] and Ne[22] in a ratio of 53.5% to 46 5% by volume with a tolerance of ±1%.

While the present invention claims a reciprocal anisotropic dispersion element having a frequency of 35 MHz, 166 MHz or 250 MHz, it will be understood from the foregoing that the preferred frequency is 250 MHz. It will be also understood that other frequencies from 250 MHz to zero will cross the so-called zero line at some value. The values described and claimed here for the 35 MHz and 166 MHz are included as examples and are not intended to limit the scope of the present invention simply to those frequencies.

We claim:

1. In a Zeeman ring laser gyro insensitive to variations of its detuning frequency including means for propagating multiple modes of coherent light within an active laser medium having right and left circularly polarized beams each propagating in a clockwise and counterclockwise direction about the ring laser and means for producing a magnetic field collinear to said multiple modes of coherent light, the improvement comprising:

reciprocal anisotropic dispersion means through which said multiple modes of coherent light are passed for optically splitting said right and left circularly polarized beams by $250 \pm 10$ MHz; and nonreciprocal anisotropic dispersion means through which said multiple modes of coherent light are passed from Faraday splitting said clockwise and counterclockwise beams comprising said means for producing a magnetic field collinear to said multiple modes of coherent light having a magnitude of $30 \pm 20$ gauss.

2. In a Zeeman ring laser gyro as claimed in claim 1, the improvment additionally comprising:

said active laser medium comprising a medium of helium-neon consisting of neon isotopes in which $53.5 \pm 1\%$ by volume is the $Ne^{20}$ isotope and $46.5 \pm 1\%$ by volume is the $Ne^{22}$ isotope;

wherein said gyro is also insensitive to variations of magnetic fields.

3. In a Zeeman ring laser gyro having four modes of laser oscillation in an active laser medium at four different frequencies, with two of the mode propagating in each direction and each of said two propagated modes having right and left circularly polarized waves, the improvement comprising:

reciprocal anisotropic dispersion means through which said four different frequencies pass for optically splitting said right and left circularly polarized beams by $250 \pm 10$ MHz;

nonreciprocal anisotropic dispersion means for applying a magnetic field collinear to said four different frequencies having a magnitude of $30 - 20$ gauss;

an active laser medium of helium-neon consisting of isotopes of $Ne^{20}$ and $Ne^{22}$ in which $Ne^{20}$ is $53.5 \pm 1\%$ by volume and $Ne^{22}$ is $46.5 \pm 1\%$ by volume; and wherein said gyro is insensitive to variations in detuning frequency and magnetic fields.

4. In a Zeeman ring laser gyro, as claimed in claim 3, wherein:

said reciprocal anisotropic dispersion means is quartz crystal.

5. In a Zeeman ring laser gyro insensitive to variations in magnetic fields including means for propagating four modes of laser oscillation in an active laser medium at four different frequencies, with two of the modes propagating in each direction and each of said two propagated modes having right and left circularly polarized waves and means for establishing a uniform magnetic field collinear to said four modes of laser oscillation, the improvement comprising:

said laser medium consisting of a helium-neon gas in which the active isotopes of $Ne^{20}$ and $Ne^{22}$ are present in a ratio of $53.5 \pm 1\%$ to $46.5 \pm 1\%$ by volume.

6. In a Zeeman ring laser gyro, as claimed in claim 5, the improvement additionally comprising:

reciprocal anisotropic dispersion means for optically splitting said right and left circularly polarized waves by $250 \pm 10$ MHz; and said means for establishing a uniform magnetic field collinear to said four modes of laser oscillation having a magnitude of $30 \pm 20$ gauss; and wherein said gyro is also insensitive to variations in detuning frequency.

7. In a Zeeman ring laser gyro insensitive to variations in its detuning frequency including a plurality of mirrors defining a resonant structure, gain sections for delivering energy to said ring laser, an active laser medium confined between said mirrors to define a ring laser, means for producing four different modes of laser oscillation in the laser medium at four different frequencies, with two of the modes propagating in each direction and each of said two propagating modes having right and left circularly polarized waves, and means for establishing a uniform magnetic field collinear to said four modes of laser oscillation, the improvement comprising:

reciprocal anisotropic dispersion means for optically splitting said right and left circularly polarized waves by $250 \pm 10$ MHz;

said means for establishing a uniform magnetic field collinear to said four modes of laser oscillation, having a magnitude of $30 \pm 20$ gauss.

8. The Zeeman ring laser gyro of claim 7 in which the improvement further comprises:

said laser medium consisting of a helium-neon gas in which the active isotopes of $Ne^{20}$ and $Ne^{22}$ are respectively present in a ratio of $53.5 \pm 1\%$ to $46.5 \pm 1\%$ by volume; and wherein said gyro is also insensitive to variations in magnetic fields.

* * * * *